United States Patent [19]

Bork et al.

[11] 4,066,576

[45] Jan. 3, 1978

[54] POLYETHYLENE MIXTURE FOR THE MANUFACTURE OF SEMICONDUCTIVE FILMS FOR BAGS AND SACKS

[75] Inventors: Siegfried Bork; Georg Sam, both of Frankfurt am Main, Germany

[73] Assignee: Hoechst Aktiengesellschaft, Frankfurt am Main, Germany

[21] Appl. No.: 677,510

[22] Filed: Apr. 16, 1976

[30] Foreign Application Priority Data

Apr. 19, 1975 Germany ............................ 2517358

[51] Int. Cl.$^2$ ........................ H01B 1/04; C08K 3/04
[52] U.S. Cl. ................................ 252/511; 260/23 H; 260/31.6; 260/32.6 A; 260/32.6 PQ; 260/42.46; 260/889; 260/897 A
[58] Field of Search ...................... 260/42.46, 897 A; 252/511

[56] References Cited

U.S. PATENT DOCUMENTS

| | | | |
|---|---|---|---|
| 2,997,451 | 8/1961 | Miller | 260/42.46 |
| 3,137,672 | 6/1964 | Lehane | 260/897 A |
| 3,261,889 | 7/1966 | van't Wout | 260/897 A |

FOREIGN PATENT DOCUMENTS

| | | |
|---|---|---|
| 2,404,330 | 8/1975 | Germany. |
| 2,047,333 | 4/1971 | Germany. |

*Primary Examiner*—James H. Derrington
*Attorney, Agent, or Firm*—Curtis, Morris & Safford

[57] ABSTRACT

Mixtures of a low density polyethylene, a rubber and a highly conductive carbon black can be processed to films having an especially low surface resistance.

15 Claims, No Drawings

POLYETHYLENE MIXTURE FOR THE MANUFACTURE OF SEMICONDUCTIVE FILMS FOR BAGS AND SACKS

The present invention relates to a polyethylene mixture for the manufacture of semi-conductive films for bags and sacks.

Films made from polyethylene, above all from low density polyethylene, are used to a large extent for packaging various goods, especially in the form of bags and sacks made of such films. Due to friction, filling and emptying of polyethylene sacks having powdery contents may cause a considerable electrostatic charge which induces spark formation and, under unfavorable conditions, may result even in explosions and fires.

Electrostatic charge can be prevented with certainty only when sacks having a surface resistance of less than $10^6 \Omega$ are used. Numerous processes have been proposed to provide plastics materials with an antistatic finish, but a permanent reduction of the surface resistance to a value below $10^6 \Omega$ cannot always be achieved. Surface active compounds can be applied to the surface of or incorporated in the material, or the surface can be chemically modified, for example by sulfonation (cf. German Published Specification No. 1,953,371). All these methods have the disadvantage that the overall effect depends on atmospheric humidity and is wholly or temporarily lost by abrasion.

It has also been proposed to reduce the surface resistance of plastics materials by the addition of carbon black. To obtain, however, a value below $10^6 \Omega$ in the case of low density polyethylene, amounts of about 20% by weight of commercial, conductive carbon black are required. The high amounts of carbon black adversely affect the tenacity of the polyethylene to a large extent. Although it is possible to improve the tenacity of carbon black containing low density polyethylene by adding simultaneously certain rubbers, sufficient mechanical properties cannot be obtained in the case of mixtures containing 20% by weight of carbon black. For sacks to be applied for heavy goods, for which films having a thickness of at least 150 μm are generally used, the impact strength, determined on molded plates according to German Industrial Standard DIN 53 448, is required to be at least 1300, preferably 1500 kpcm/cm². In the case of small sacks or bags manufactured from films having a thickness of 50μm and more, an impact strength of 800 or, preferably, 1000 kpcm/cm² is sufficient. However, all hitherto known mixtures of high pressure polyethylene and usual conductive carbon blacks were not capable of attaining both the above values, even with simultaneous addition of rubber, as illustrated in the following Table:

TABLE 1

| Product | Surface resistance DIN 53 482 | | Impact strength DIN 53 448 |
|---|---|---|---|
| | 1 mm molded plate | 100 μm blown sheet | 1 mm molded plate kpcm/cm² |
| polyethylene | >$10^{13}$ | >$10^{13}$ | 2000 |
| 85% polyethylene 15% carbon black I | >$10^{11}$ | >$10^{12}$ | 310 |
| 80% polyethylene 20% carbon black I | 5.6·$10^4$ | 3.0·$10^8$ | 220 |
| 75% polyethylene 10% carbon black I 15% C₂C₃-copolymer 1) | >$10^{13}$ | >$10^{13}$ | 2238 |
| 70% polyethylene 20% carbon black II 10% polyisobutylene | 4.7·$10^3$ | 2.0·$10^6$ | 320 |
| 61.5% polyethylene 20% carbon black II 18.5% EVA-copolymer 2) | 6.7·$10^6$ | 1.6·$10^{10}$ | 630 |
| 65% polyethylene 20% carbon black II 15% C₂C₃-copolymer 1) | 7.9·$10^6$ | 1.0·$10^{11}$ | 1410 |
| 60% polyethylene 20% carbon black II 20% C₄C₅-copolymer 3) | 3.4·$10^3$ | 4.0·$10^9$ | 730 | polyethylene: low density polyethylene, density = 0.919 g/cm³, melt index MFI 190/2 (DIN 53 735) = 0.25 g/10 min., stabilized with 0.2 wt. % 4,4'-thio-bis-(6-tert.-butyl-m-cresol) and 1 wt. % calcium stearate.
carbon black I: highly conductive carbon black, BET surface = 133 m²/g, oil absorption = abt. 5 ml/g, content of volatile substances = 1 %, ash content = 0.07% and pH = 8.
carbon black II: conductive carbon black, BET surface = 120 m²/g oil absorption = abt. 4.5 ml/g, content of volatile substances = 2%, ash content = 0.2 % and pH = 9.
C₂C₃-copolymer 1) ethylene/propylene/diene copolymer 82.4 wt. % ethylene, 1.1 double bonds per 100 carbon atoms, ML 1+4 (100° C) = 89.
EVA-copolymer 2): ethylene/vinyl acetate copolymer vinyl acetate = 45 wt. %, ML 1+4 (100° C) = 22, MFI 190/2 = 4.
C₄C₅-copolymer 3): isobutylene/isoproprene copolymer ML 1+3 (127° C) = 55, unsaturation 1.75 mol-%.

As Table 1 shows, the surface resistance of molded plates containing 20% of carbon black is sufficiently decreased in certain cases, but that of blown films, important for sacks and bags, however, is too high in each case, and the impact strength is considerably decreased.

Thus, a sheet material having a surface resistance of less than $10^6 \Omega$ and an impact strength of at least 800, preferably of more than 1300 kpcm/cm² was urgently required.

It has now been found that the intended decrease of the surface resistance below $10^6 \Omega$ can be obtained by adding substantially smaller amounts of carbon black than hitherto required, when a special carbon black is used. With the simultaneous addition of certain saturated or weakly unsaturated rubbers, mixtures are obtained which have a low surface resistance and excellent mechanical properties, and which are perfectly suitable for the manufacture of films for bags and sacks.

The subject of the present invention is therefore a semi-conductive polyethylene mixture for the manufacture of films for bags and sacks having a low surface resistance and good mechanical properties, which contains a. from 60 to 84, preferably from 65 to 75, % by weight of polyethylene having a density of 0.915–0.930 g/cm³,
b. from 7.5 to 30, preferably from 13 to 20, % by weight of a saturated or weakly unsaturated rubber, and
c. from 8.5 to 15, preferably from 9 to 12, % by weight of carbon black, and optionally usual additives such as stabilizers, processing auxiliaries or lubricants, wherein the carbon black has a BET surface of from 300 to 1500, preferably from 600 to 1100, m²/g, an oil absorption of from 2.5 to 6.5, preferably from 3.0 to 4.0, ml/g, a content of volatile substances of from 0.1 to 6.0, preferably from 0.5 to 4.0, % by weight, a pH of from 7 to 10, preferably from 8 to 9.5 and an ash content of from 0.5 to 5.0, preferably from 0.5 to 1.0, % by weight.

The BET surface of a carbon black is determined according to Brunauer, Emmet and Teller, J. Amer. Chem. Soc. 60 (1938), p. 309. In order to determine the mechanical properties, it is preferable to test the impact strength. The surface resistance is measured according to German Industrial Standard DIN 53 482, using electrode arrangement A and a test voltage of 5 volts.

A carbon black having the required properties for use according to the present invention is obtained for example as by-product of known gassing processes for the manufacture of carbon dioxide and hydrogen containing gas mixtures from hydrocarbons. Such carbon black has been used already together with non-conductive fillers for the manufacture of electro-conductive vulcanization products (see German Published Specification No. 2,047,333); however, it is expressly pointed out that there are many disadvantages when using this carbon black per se, since processing becomes difficult and the mechanical properties are poor. Therefore, it was not to be concluded from these indications that mixtures of low density polyethylene, certain rubbers and this carbon black, without further fillers, are especially appropriate for the manufacture of semi-conductive films for bags and sacks having a low surface resistance and good mechanical properties.

A suitable polyethylene for the mixture of the present invention is above all a low density polyethylene having a density of 0.919–0.930 g/cm³ and a melt flow index MFI 190/2 according to German Industrial Standard DIN 53 735 of from 0.1 to 3.0, preferably from 0.1 to 1.0, g/10 min. Copolymers of ethylene and up to 5% by weight of comonomers, for example vinyl acetate, or esters of acrylic acid and alcohols having from 1 to 4 carbon atoms, may also be used.

As saturated or weakly unsaturated rubbers, there may be employed butyl rubbers, for example copolymers of isobutylene and isopropene having an unsaturation of from 0.6 to 2.5 mol %, and a Mooney viscosity ML 1+3 (127° C) of from 40 to 70; polyisobutylene having a molecular weight of from 500,000 to 2,000,000; ethylene/propylene rubbers containing from 40 to 70% by weight of ethylene and from 30 to 60% by weight of propylene, density 0.85–0.87 g/cm³, ML 1+8 (100° C) of from 30 to 60; ethylene/vinyl acetate copolymers containing from 10 to 50% by weight of vinyl acetate and having a melt flow index MFI 190/2 of from 2 to 5 g/10 min and ML 1+4 (100° C) of from 15 to 55, and above all ethylene/propylene/diene rubbers. Copolymers having from 40 to 85, preferably 50 to 80, % by weight of ethylene, from 14.5 to 59.5, preferably from 19 to 49, % by weight of propylene and from 0.3 to 10.0, preferably from 0.5 to 6, % by weight of a non-conjugated diene, for example hexadiene-(1,4), dicyclopentadiene or ethylidene-norbornene are preferably used. These copolymers have advantageously a Mooney viscosity ML 1+4 (100° C) according to DIN 53 523 of from 35 to 100, especially from 70 to 90, and a content of double bonds of from 0.5 to 4, preferably from 1 to 1.5 per 1000 carbon atoms. Suitable ethylene/propylene/diene rubbers are commercialized under the trade names of Nordel ® 1500 and 1560 (Du Pont), Buna ® AP 447 (Chemische Werke Huls), and Vistalon ® 3708 (Esso).

As stabilizers for the mixtures of the invention, phenolic antioxidants may be used, for example 4,4'-thio-bis-(6-tert.-butyl-m-cresol) or 2,6-ditert.-butyl-4-methylphenol, in amounts of from 0.01 to 2.0, preferably from 0.05 to 1.0% by weight, relative to the mixture.

Generally, the addition of lubricants and processing agents is no longer required in most cases. However, metal stearates, for example calcium or zinc stearate, glycerol esters such as glycerol monostearate, or long-chain fatty acid amides, such as oleic or erucic acid amide may be used in amounts of from 0.1 to 1.0% by weight, relative to the mixture.

When 8.5 to 9% by weight of the above carbon black are added to mixtures of low density polyethylene and rubber, the surface resistance of films is decreased to less than $10^6 \Omega$. Larger amounts decrease the surface resistance still further, but adversely affect the mechanical properties, so that amounts above 15% by weight do not bring about any advantage. Best results are obtained using from 9 to 12% by weight of carbon black, relative to the mixture. In these mixtures, the surface resistance is reduced to the intended value, while the mechanical properties are still sufficiently good.

The mixtures may be prepared according to normal processes, for example by premixing in a kneader, crushing of the mixture formed and homogenizing and granulating it in an extruder. The low density polyethylene and the rubber may be also ground previously in a mill, subsequently carbon black and stabilizers are added to the polymers in a low-speed mixer, and the mixture is then homogenized and granulated in a double-screw extruder. Films may then be manufactured from the granules on usual film blow-molding plants, preferably provided with low-speed screws. For sacks to be applied for heavy goods, films having a thickness of more than 150 μm are required, and for smaller sacks or bags, the thickness of the films may be reduced to about 50 μm. The mixtures of the invention allow the manufacture of films having a thickness of 30 μm.

The following examples illustrate the invention, parts and percentages being by weight unless otherwise stated.

EXAMPLE 1

65 Parts of a low density polyethylene, melt flow index (DIN 53 735) MFI 190/2 of 0.25 g/10 min, density 0.919 g/cm³, and 25 parts of a terpolymer (EPDM) of 82.4% of ethylene, 17.25% of propylene and 0.35% of hexadiene-(1,4), dnesity 0.85 g/cm³, Mooney viscosity (ML 1+4, 100° C) 89, were homogenized for 5 minutes at 110° – 120° C in a double-shaft kneader. Subsequently, 10 parts of a carbon black (BET surface 950 m²/g, oil absorption 3.2 ml/g, content of volatile substances 1%, pH 8, ash content 0.7%) and 0.2 parts of 4,4'-thio-bis-(6-tert.-butyl-m-cresol) were added, the temperature was raised to 150° C and homogenization was continued for a further 10 minutes. Subsequently, the mass was laminated on a roll mill to form a rough sheeting having a thickness of 1 – 2 mm, the sheeting was cut and ground in a mill, and the powder obtained was granulated at 180° C by means of a single-screw extruder. From the granulate, molded plates having a thickness of 1 mm were formed of 1 mm were formed and a film having a thickness of 100 μm was manufactured on a film blow-molding plant at a nozzle temperature of 200° C. The surface resistance and the impact strength was measured on the plates and the surface resistance of the films was also determined.

EXAMPLE 2

According to Example 1, molded plates and blown films were manufactured from a mixture of 75 parts of the same low density polyethylene, 10 parts of the same carbon black and 15 parts of a terpolymer (EPDM) of 75% of ethylene, 23.8% of propylene and 1.2% of ethylidene-norbornene (density 0.86 g/cm², Mooney viscosity (ML 1+4, 100° C) 85). Stabilizing and processing operations were as indicated in Example 1.

EXAMPLE 3

75 Parts of the low density polyethylene as indicated in Example 1 and 15 parts of the same terpolymer (EPDM) as described in Example 1 were ground separately in a mill and mixed in a low-speed mixer with 10 parts of the same carbon black and 0.2 part of the same stabilizer as indicated in the previous Examples. Subsequently, the mixture was homogenized and granulated in a double-screw extruder having kneading and mixing zones. Molded plates and blown films were manufactured from the granules and subsequently tested.

EXAMPLE 4

Example 1 was repeated; however, 76 parts of the low density polyethylene were mixed with 15 parts of the terpolymer (EPDM) and 9 parts of carbon black. Surface resistance and impact strength were determined on molded plates and blown films.

EXAMPLE 5

80 Parts of the low density polyethylene of Example 1 were mixed with 10 parts of a terpolymer (EPDM) of 74% of ethylene 22.5% of propylene and 3.5% of ethylidene-norbornene (density 0.86 g/cm³, Mooney viscosity (ML 1+4, 100° C) 65), 10 parts of the carbon black of Example 1, 0.2 part of 4,4'-thio-bis(6-tert.-butyl-m-cresol) and 1 part of calcium stearate, subsequently homogenized, granulated, processed to plates and films and tested as described in Example 1.

EXAMPLE 6

71.5 parts of a low density polyethylene (melt flow index MFI 190/2 of 0.25 g/10 min, density 0.919 g/cm³) were mixed with 20 parts of polyisobutylene (PIB) having a mean molecular weight of 1,000,000, 8.5 parts of a carbon black (BET surface 800 m²/g, oil absorption 320 ml/g, content of volatile substances 3.5%, pH 8, ash content 0.7%), 0.2 part of 4,4'-thio-bis(6-tert.-butyl-m-cresol) and 1 part of calcium stearate, processed to molded plates and blown films and tested as indicated in Example 1.

EXAMPLE 7

80 parts of the low density polyethylene of Example 1 were mixed with 10 parts of an isobutylene/isoprene copolymer (butyl rubber) (unsaturation 1.75 mol %, density 0.92 g/cm³, Mooney viscosity (ML 1+3, 127° C) 55), 10 parts of the carbon black of Example 1, 0.2 part of 4,4'-thio-bis(6-tert.-butyl-m-cresol) and 1 part of calcium stearate, processed to molded plates and blown films and tested as indicated in Example 1.

EXAMPLE 8

60 parts of the low density polyethylene of Example 1 were mixed with 30 parts of a copolymer of 40% of ethylene and 60% of propylene (EPM) (density 0.86 g/cm³, Mooney viscosity (ML 1+8, 100° C) 40), 10 parts of the carbon black of Example 1, 0.2 part of 4,4'-thio-bis(6-tert.-butyl-m-cresol) and 1 part of calcium stearate, homogenized, granulated, processed to molded plates and blown films and tested as indicated in Example 1.

EXAMPLE 9

70 parts of the low density polyethylene of Example 1 and 20 parts of an ethylene/vinyl acetate copolymer (EVA) (vinyl acetate content 45%, Mooney viscosity (ML 1+4, 100° C) 50) were mixed as indicated in Example 1 with 10 parts of the same carbon black, 0.2 part of 4,4'-thio-bis-(6-tert.-butyl-m-cresol) and 1 part of calcium stearate, laminated, crushed and granulated. From the granules, molded plates and blown films having a thickness of 100 μm were manufactured, the latter ones on a blow-molding plant.

EXAMPLE 10

According to Example 1, molded plates and blown films were manufactured from a mixture of 65 parts of a low density polyehtylene (density 0.918 g/cm³, melt flow index MFI 190/2 1.5 g/10 min.), 25 parts of the terpolymer (EPDM) of Example 1, 10 parts of the same carbon black and 0.2 part of 4,4'-thio-bis-(6-tert.-butyl-m-cresol), and tested.

All films were excellently weldable, and they were processed to sacks. The test results of the films and plates of Examples 1 to 10 are listed in Table 2.

| Example | polyethylene parts by weight | rubber parts by weight | carbon black parts by weight | surface resistance DIN 53 482 molded plate Ω | surface resistance DIN 53 482 blown film Ω | impact strength DIN 53 448 molded plate kgcm/cm² |
|---|---|---|---|---|---|---|
| 1 | 65 | EPDM 25 | 10 | 20 | 2·10⁴ | 2000 |
| 2 | 75 | EPDM 15 | 10 | 25 | 1.7·10⁴ | 580 |
| 3 | 75 | EPDM 15 | 10 | 19 | 1.9·10³ | 1840 |
| 4 | 76 | EPDM 15 | 9 | 19 | 3.7·10³ | 1850 |
| 5 | 80 | EPDM 10 | 10 | 36 | 1.0·10⁴ | 1400 |
| 6 | 71.5 | PIB 20 | 8.5 | 34 | 3.2·10⁵ | 1050 |
| 7 | 80 | butyl-rubber 10 | 10 | 22 | 6.1·10³ | 934 |
| 8 | 60 | EPM 30 | 10 | 18 | 4.9·10³ | 1070 |
| 9 | 70 | EVA 20 | 10 | 21 | 5.2·10³ | 1100 |
| 10 | 65 | EPDM 25 | 10 | 26 | 2.5·10⁴ | 1100 |

What is claimed is:

1. A polyethylene mixture for the manufacture of semi-conductive films for bags and sacks having a surface resistance of less than $10^6 \Omega$ and good mechanical properties, which contains
   a. from 60 to 84% by weight of polyethylene having a density of 0.915–0.930 g/cm$^3$, or of a copolymer of ethylene containing up to 5% by weight of co-monomers,
   b. from 7.5 to 30% by weight of a saturated or weakly unsarated rubber, and
   c. from 8.5 to 15% by weight of carbon black, and optionally usual additives such as stabilizers, procesing auxiliaries or lubricants, wherein the carbon black has a BET surface of from 300 to 1500 m$^2$/g, an oil absorption of from 2.5 to 6.5 ml/g, a content of volatile substances of from 0.1 to 6.0% by weight, a pH of from 7 to 10, and an ash content of from 0.5 to 5.0% by weight.

2. The polyethylene mixture as claimed in claim 1, wherein the carbon black has a BET surface of from 600 to 1100 m$^2$/g.

3. The polyethylene mixture as claimed in claim 1, wherein the carbon black has an oil absorption of from 3.0 to 4.0 ml/g.

4. The polyethylene mixture as claimed in claim 1, wherein the carbon black has a content of volatile substances of from 0.5 to 4% by weight.

5. The polyethylene mixture as claimed in claim 1, wherein the carbon black has a pH of from 8 to 9.5.

6. The polyethylene mixture as claimed in claim 1, wherein the carbon black has an ash content of from 0.5 to 1% by weight.

7. The polyethylene mixture as claimed in claim 1, wherein the mixture contains from 65 to 75% by weight of low density polyethylene.

8. The polyethylene mixture as claimed in claim 1, wherein the mixture contains from 13 to 20% by weight of a weakly unsaturated rubber.

9. The polyethylene miyture as claimed in claim 1, wherein the mixture contains from 9 to 12% by weight of carbon black.

10. The polyethylene mixture as claimed in claim 1, wherein the mixture contains a polyethylene having a melt flow index MFI 190/2 of from 0.1 to 3.0 g/min.

11. The polyethylene mixture as claimed in claim 1, which comprises using an ethylene/propylene/diene copolymer as rubber.

12. The polyethylene mixture as claimed in claim 11, which comprises using a copolymer of from 40 to 85% by weight of ethylene, from 14.5 to 59.5% by weight of propylene and from 0.3 to 10 weight % of a non-conjugated diene.

13. The polyethylene mixture as claimed in claim 12, wherein hexadiene-(1,4), dicyclopentadiene or ethylidene-norbornene is used as non-conjugated diene.

14. The polyethylene mixture as claimed in claim 11, which comprises using an ethylene/propylene/diene copolymer having a Mooney viscosity ML (1+4) at 100° C of from 35 to 100 and a content of double bonds of from 0.5 to 4 per 1000 carbon atoms.

15. Bags or sacks manufactured from the polyethylene mixtures as claimed in claim 1.

* * * * *